US008819112B2

(12) United States Patent
Shon

(10) Patent No.: US 8,819,112 B2
(45) Date of Patent: Aug. 26, 2014

(54) METHOD, SYSTEM AND TERMINAL FOR CHANGING A MANAGEMENT OBJECT OF BROADCAST SERVICE GUIDE

(75) Inventor: Min-Jung Shon, Seoul (KR)

(73) Assignee: LG Electronics Inc., Seoul (KR)

(*) Notice: Subject to any disclaimer, the term of this patent is extended or adjusted under 35 U.S.C. 154(b) by 790 days.

(21) Appl. No.: 12/162,470

(22) PCT Filed: Feb. 2, 2007

(86) PCT No.: PCT/KR2007/000583
§ 371 (c)(1),
(2), (4) Date: Jul. 28, 2008

(87) PCT Pub. No.: WO2007/089123
PCT Pub. Date: Aug. 9, 2007

(65) Prior Publication Data
US 2009/0025037 A1    Jan. 22, 2009

Related U.S. Application Data

(60) Provisional application No. 60/764,793, filed on Feb. 3, 2006.

(30) Foreign Application Priority Data

Feb. 2, 2007   (KR) .................. 10-2007-0010903

(51) Int. Cl.
*G06F 15/16*     (2006.01)
*H04L 12/24*     (2006.01)
*H04L 12/18*     (2006.01)
*H04W 72/00*     (2009.01)

(52) U.S. Cl.
CPC ........ *H04L 12/1868* (2013.01); *H04L 41/0233* (2013.01); *H04L 12/189* (2013.01); *H04W 72/005* (2013.01)
USPC ................ 709/203; 709/205; 725/39; 725/50

(58) Field of Classification Search
USPC .......... 725/39, 49, 50, 54; 709/205, 203, 217, 709/219
See application file for complete search history.

(56) References Cited

U.S. PATENT DOCUMENTS 5,657,072 A * 8/1997 Aristides et al. ................ 725/46
5,666,645 A * 9/1997 Thomas et al. ................. 725/47

(Continued)

FOREIGN PATENT DOCUMENTS

| KR | 10-2001-0019640 A | 3/2001 |
| KR | 10-2004-0016065 A | 2/2004 |
| WO | WO 2005/045603 A2 | 5/2005 |

OTHER PUBLICATIONS

Ericsson et al.; SyncML Device Mangement Tree and Description; Feb. 25, 2002; ver. 1.1; p. 1-38.*

(Continued)

*Primary Examiner* — Jimmy H Tran
(74) *Attorney, Agent, or Firm* — Birch, Stewart, Kolasch & Birch, LLP

(57) ABSTRACT

A method, system and terminal for changing an MO of a broadcast service guide. The method for changing an management object (MO) of a broadcast service guide includes: installing an MO tree by a terminal upon receiving a service guide for which at least one management object has been formed from a broadcast server; changing by the terminal a corresponding MO upon receiving a change-requested parameter of the service guide MO from a DM server; and updating by the terminal a corresponding portion of the service guide based on the changed MO. When the subscriber terminal which has received the broadcast service has a problem or needs to be updated, the problem of the terminal can be remotely, quickly and easily solved by correcting the change-requested parameter of the MO of the service guide of the terminal side according to a request of the server or the terminal.

9 Claims, 7 Drawing Sheets

(56) References Cited

U.S. PATENT DOCUMENTS

| | | | |
|---|---|---|---|
| 5,917,481 A * | 6/1999 | Rzeszewski et al. | 715/721 |
| 5,963,264 A * | 10/1999 | Jackson | 348/460 |
| 6,057,890 A * | 5/2000 | Virden et al. | 348/563 |
| 6,157,809 A * | 12/2000 | Kambayashi | 725/91 |
| 6,271,893 B1 * | 8/2001 | Kawaguchi et al. | 348/725 |
| 6,405,372 B1 * | 6/2002 | Kim et al. | 725/50 |
| 6,536,041 B1 * | 3/2003 | Knudson et al. | 725/39 |
| 6,701,526 B1 * | 3/2004 | Trovato | 725/39 |
| 6,996,627 B1 * | 2/2006 | Carden | 709/237 |
| 7,490,343 B1 * | 2/2009 | Gordon et al. | 725/54 |
| 7,548,565 B2 * | 6/2009 | Sull et al. | 370/503 |
| 7,650,423 B2 * | 1/2010 | Carden | 709/237 |
| 7,657,909 B1 * | 2/2010 | Nagasaka et al. | 725/53 |
| 7,844,964 B2 * | 11/2010 | Marolia | 717/172 |
| 2002/0046139 A1 | 4/2002 | Ozaki et al. | |
| 2002/0112239 A1 * | 8/2002 | Goldman | 725/46 |
| 2002/0129370 A1 * | 9/2002 | Kikinis | 725/55 |
| 2002/0135698 A1 * | 9/2002 | Shinohara | 348/473 |
| 2002/0194598 A1 | 12/2002 | Connelly | |
| 2003/0106065 A1 * | 6/2003 | Sakai et al. | 725/91 |
| 2003/0159157 A1 * | 8/2003 | Chan | 725/151 |
| 2003/0177503 A1 * | 9/2003 | Sull et al. | 725/112 |
| 2003/0208757 A1 * | 11/2003 | Hoath | 725/39 |
| 2004/0083489 A1 * | 4/2004 | Bansal et al. | 725/44 |
| 2004/0103435 A1 | 5/2004 | Yi et al. | |
| 2005/0022237 A1 * | 1/2005 | Nomura | 725/39 |
| 2005/0097605 A1 * | 5/2005 | Itou | 725/45 |
| 2005/0213938 A1 * | 9/2005 | Ozawa et al. | 386/83 |
| 2005/0216942 A1 * | 9/2005 | Barton | 725/97 |
| 2006/0010437 A1 * | 1/2006 | Marolia | 717/168 |
| 2006/0095543 A1 * | 5/2006 | Ito et al. | 709/218 |
| 2006/0174271 A1 * | 8/2006 | Chen et al. | 725/39 |
| 2006/0199568 A1 * | 9/2006 | Seo et al. | 455/414.1 |
| 2006/0206607 A1 * | 9/2006 | Carden | 709/224 |

OTHER PUBLICATIONS

Ericsson et al.; SyncML Device Management Protocol; Feb. 15, 2002; ver. 1.1; p. 1-37.*

Microsoft Computer Dictionary. 5$^{th}$ ed..; Mircrosoft Press; ; 2002.*

* cited by examiner

METHOD, SYSTEM AND TERMINAL FOR CHANGING A MANAGEMENT OBJECT OF BROADCAST SERVICE GUIDE

This application is the National Phase of PCT/KR2007/000583 filed on Feb. 2, 2007, which claims priority under 35 U.S.C. 119(e) to U.S. Provisional Application No. 60/764,793 filed on Feb. 3, 2006 and under 35 U.S.C. 119(a) to Patent Application No. 10-2007-0010903 filed in Korea on Feb. 2, 2007. Both of these prior applications are hereby expressly incorporated by reference into the present application.

BACKGROUND OF THE INVENTION

1. Field of the Invention

The present invention relates to a method, system and terminal for changing a management object (MO) of a broadcast service guide and, more particularly, to a method, system and terminal for changing an MO of a broadcast service guide capable of remotely solving a problem of a terminal quickly and easily by partially correcting a parameter requested to be changed among MOs of a service guide of a terminal side when the subscriber terminal that receives the broadcast service has a problem and upon receiving a corresponding request of a server or the terminal.

2. Description of the Related Art

A broadcast service refers to providing broadcast data(signals) or various supplementary information to a mobile terminal over the air interface. Namely, the broadcast service is a fresh type mobile terminal service including a service type that a service provider provides usable information to every subscriber of its service and a service type (multicast service) that the service provider provides information to only subscribers of a certain group which have subscribed to a certain item or contents.

The broadcast service basically provides the same service to multiple subscribers at the same time, and an advantage of such broadcast service is that subscribers can be managed in a one-to-multiple manner while providing the same service. Namely, multiple subscribers can be accommodated by a single transmission of the broadcast service.

Meanwhile, a device management (DM) technique to be applied to the broadcast service refers to a technique that when a particular processing command is received from a DM server, a DM client performs the corresponding command.

In such DM techniques, a state value that changes while an operation is being performed or a measured value that is measured periodically (or when a certain event occurs) or other types of values are formed by a certain device (e.g., a terminal) as at least one DM object of a DM tree (or other type of hierarchy structure used for performing device management), and such values are stored in the DM object whenever there is a change in such values. Accordingly, the DM server can remotely read and check the state value, the measurement value, and the like stored in the DM object(s) by using DM techniques.

The DM technique is based on a two-way protocol that a DM message may be transmitted and received through a DM session and a one-to-one communication protocol.

FIG. 1 is a signal flow chart schematically showing a main procedure of the DM protocols.

In order to transfer a DM command, the DM server should first create a DM session. Namely, the DM server transmits a DM session notification message to a terminal (or device) through pushing, the terminal is connected with the DM server to request a connection of the DM session.

In some cases, however, the DM session notification message may not be required (for example, when the device informs the DM server about a certain event generated therein).

Upon receiving the DM session request from the DM client, the DM server verifies authentication information of the device and allows a connection of a DM session to thus complete the connection of the DM session. After the DM session is connected, the DM server transfers the DM command to the DM client and the DM client performs the received DM command and transmits corresponding results to the DM server, by exchanging messages therebetween.

Then, the DM server may check the DM command performance results, and terminate the DM session or transmit a new DM command.

Through the session, the DM server may read resources existing in the device, provide new resources to the device, or change or delete resources existing in the device.

However, application of the terminal DM technique based on the two-way communication to the broadcast service has some problems as follows.

That is, the MO, the message format, used in the terminal DM technique has been defined centering on the two-way communication, not for the broadcast service.

In addition, because the broadcast service transmits broadcast contents in a point-to-multipoint manner, it does not consider whether to receive an OK response of a subscriber or not, and thus, when a corresponding subscriber terminal has a problem, a service provider cannot quickly cope with a corresponding situation to solve the problem.

SUMMARY OF THE INVENTION

Therefore, in order to address the above matters the various features described herein have been conceived. One aspect of the exemplary embodiments is to provide a method, system and terminal for changing an management object (MO) of a broadcast service guide capable of remotely solve a problem of a terminal quickly and easily by partially correcting a parameter requested to be changed among MOs of a service guide of a terminal side when the subscriber terminal that receives the broadcast service has a problem and upon receiving a corresponding request of a server or the terminal.

This specification provides a method for changing an MO of a broadcast service guide that may include: installing an MO tree by a terminal upon receiving a service guide for which at least one management object has been formed from a first server; changing by the terminal a corresponding MO upon receiving a request of changing the MO of a service guide from a second server; and updating by the terminal a corresponding portion of the service guide based on the changed MO.

This specification also provides a method for changing an MO of a broadcast service guide that may include: installing an MO tree by a terminal upon receiving a service guide for which at least one management object has been formed from a first server; changing by the terminal an MO requested to be changed upon receiving the MO from the first server; updating by the terminal a corresponding portion of the service guide based on the changed MO.

This specification also provides a method for changing an MO of a broadcast service guide that may include: installing an MO tree by a terminal upon receiving a service guide for which at least one management object has been formed from a first server; transferring to the first server, by the terminal, a request for changing a management object (MO) of the service guide for which an error has occurred; changing by the terminal the change-requested MO upon receiving a device management (DM) command with respect to the MO change request, which has been transferred to the first server, from a second server; and updating by the terminal a corresponding portion of the service guide based on the changed MO.

This specification also provides a method for changing an MO of a broadcast service guide that may include: installing an MO tree by a terminal upon receiving a service guide for which at least one management object has been formed from a first server; transferring to the first server, by the terminal, a request for changing a management object (MO) of the service guide for which an error has occurred; changing by the terminal the change-requested MO upon receiving a parameter of the change-requested MO from the first server; and updating by the terminal a corresponding portion of the service guide based on the changed MO.

This specification also provides a system that may include: a terminal that installs an MO tree of a service guide and updates a corresponding portion of the service guide based on a changed MO; a broadcast server that provides a service guide for which at least one management object has been formed to the terminal; and a DM server that receives a request for changing an MO from the broadcast server and transfers a DM command with respect to the change of the MO to the terminal.

This specification also provides a terminal that may include: a broadcast client that receives a service guide for which at least one management object has been formed from a first server; and a DM client that installs an MO tree upon receiving the service guide for which at least one management object has been formed from the broadcast client, and changes a parameter of a corresponding MO upon receiving a DM command with respect to a change of an MO from a second server.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The construction and operation of exemplary embodiments of the present invention will now be described in detail with reference to the accompanying drawings.

The basic concept of the present invention is that when a subscriber terminal that receives a broadcast service has a problem, the problem of the terminal can be remotely solved quickly and easily such that a DM client of the terminal partially corrects a parameter requested to be changed of a service guide for which at least one management object has been formed (i.e., simply referred to as a 'service guide' hereafter) according to a corresponding requested of a server.

In order to implement the present invention, an MO, a message format defined in a terminal DM technique, should be defined in advance and an MO tree formed by reflecting a parameter essential for a broadcast service guide is required.

Figure 1:
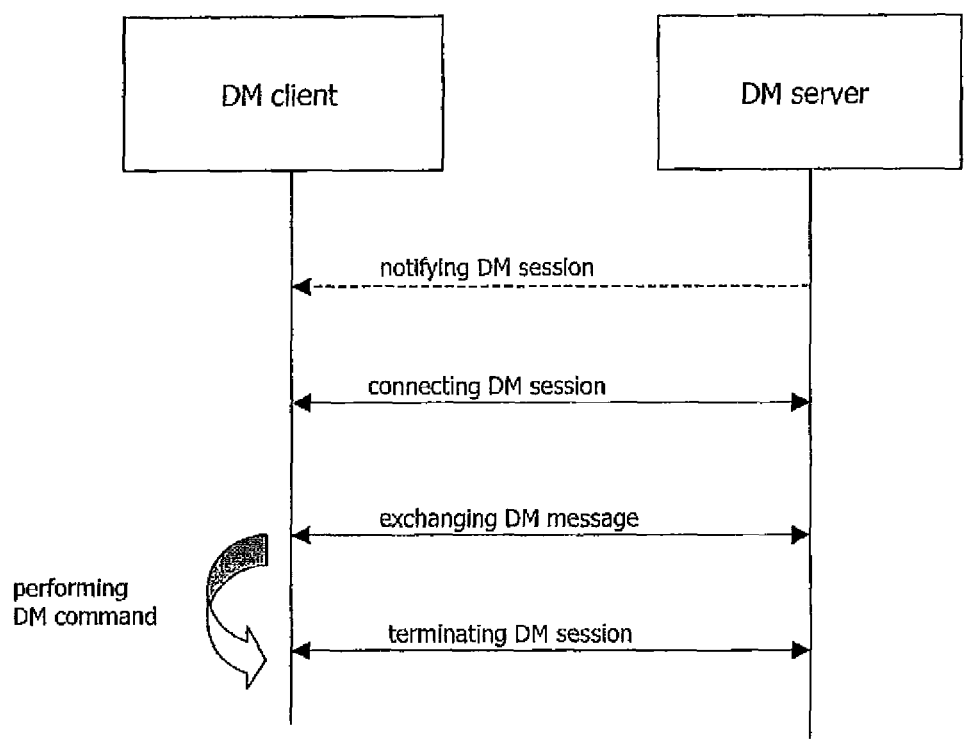
FIG. 1 is a signal flow chart schematically showing a main procedure of a general device management (DM) protocol.
Figure 2:
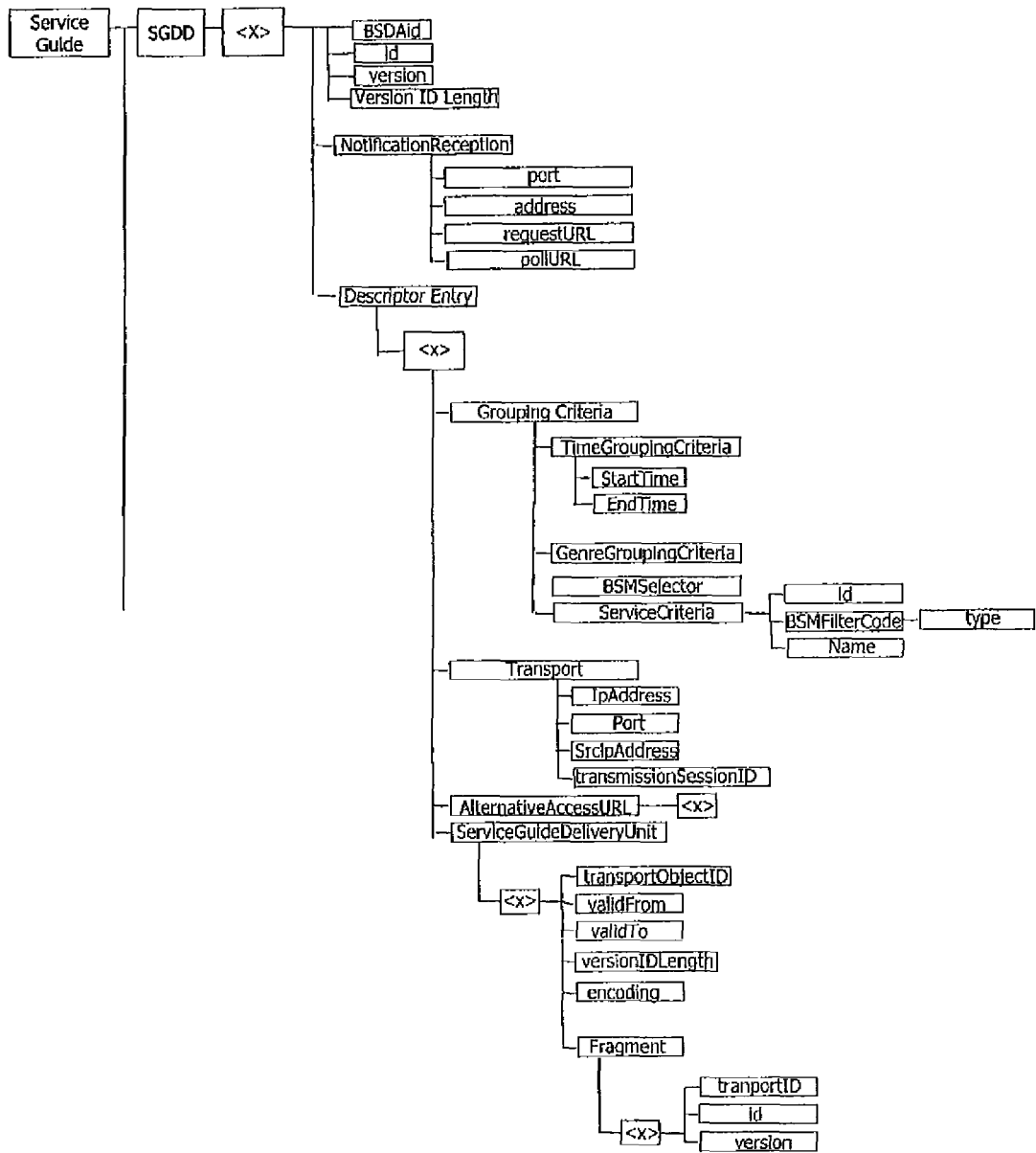
FIG. 2 is a tree distribution diagram showing an SGDD (Service Guide Delivery Description) management object (MO) of a broadcast service guide according to an exemplary embodiment of the present invention.

FIG. 2 is a tree distribution diagram showing an SGDD (Service Guide Delivery Description) management object (MO) of a broadcast service guide according to an exemplary embodiment of the present invention. The SGDD of the service guide is first transmitted to a user to allow the user to determine whether to receive the service guide.

The broadcast service guide is information a subscriber initially receives before a broadcast service starts, having a file format that various supplementary functions are added to broadcast program resources. The service guide includes several fragments which are connected with each other and mutually referred to.

Among the fragments of the service guide, the SGDD is first transmitted to the terminal in order to provide a criteria (or basis) that allows the terminal to decide whether or not reception is desirable, prior to actually transmitting the service guide fragment that can be viewed by the user on the terminal.

The tree structure is a rule (or set of rules) determined by a DM Enabler, and regulations can be determined (or set) to allow communication between the terminal and the DM server by using a format shared therebetween. The parameters to be used may already be known in the art and determined by a known Broadcast (BCAST) Enabler, and thus a description of the particular functions of each parameter will be omitted merely for the sake of brevity.

An example of a detailed specification of the SGDD MO tree is shown below. In particular, a relative portion of the specification is shown, whereby the SGDD MO tree contains respective nodes being arranged according to the requirements appropriate for the regulations (or rules) determined by the DM Enabler.

The MO tree is implemented by maintaining the form as the specification shown below. Herein, Occurrence indicates a number of configuration of a corresponding node, Format indicates a parameter type (integer, Character, etc.), Access Types defines a method for accessing the MO by the DM server, including Get, Add, Automatic, Copy, Delete, and Exec, etc. For example, the 'Access Types: Get' refers to retrieving data from a recipient. If a target of a 'Get' command is an interior node, a list of the children node names is returned as a result element.

Also, the values may identify certain matters to be additionally defined or shared.

One example of a detailed specification of the SGDD MO tree is as follows.

For example, in /<x>/SG, the SG node acts as a placeholder for all the information regarding the service guide.
Occurrence: One
Format: Node
Access Types: Get
Values: N/A
In /<x>/SG/SGDD/<x>, <x> acts as a placeholder for all the Service Guide Delivery Descriptor.
Occurrence: One
Format: Node
Access Types: Get
Values: N/A
In /<x>/SG/SGDD/<x>, <x> acts as a placeholder for the information of each Service Guide Delivery Descriptor.
Occurrence: OneorMore
Format: Node
Access Types: Get
Values: N/A
In addition <x> node acts as a placeholder for all the Notification reception parameters.
Occurrence: One
Format: Node
Access Types: Get
Values: N/A
In /<x>/SG/SGDD/<x>/NotificationReception/port, the port node specifies the General Notification Message delivery UDP Port number; delivery over Broadcast Channel.
Occurrence: ZeroOrOne
Format: integer
Access Types: Get
Values: <UDP Port Number>
In /<x>/SG/SGDD/<x>/NotificationReception/address, the address node specifies the General Notification Message delivery IP multicast address; delivery over Broadcast Channel.
Occurrence: ZeroOrOne
Format: string
Access Types: Get
Values: <IP multicast address>
In /<x>/SG/SGDD/<x>/NotificationReception/requestURL, the requestURL node specifies the URL through which the terminal can poll general Notification Messages over Interaction Channel.
Occurrence: ZeroOrOne
Format: chr
Access Types: Get
Values: <anyURI>
In /<x>/SG/SGDD/<x>/NotificationReception/pollURL, the pollURL node specifies the URL through which the terminal can subscribe to general Notification Messages; delivery over Interaction Channel.
Occurrence: ZeroOrOne
Format: chr
Access Types: Get
Values: <anyURI>
In /<x>/SG/SGDD/<x>/DescriptorEntry, DescriptorEntry node acts as a placeholder of the entries in the Service Guide Delivery Descriptor.
Occurrence: One
Format: Node
Access Types: Get
Values: N/A
In /<x>/SG/SGDD/<x>/DescriptorEntry/<x>, <x> node acts as a placeholder of the information of each entry in the Service Guide Delivery Descriptor.
Occurrence: OneOrMore
Format: Node
Access Types: Get
Values: N/A Besides, specifications have been defined by nodes of the MO tree as shown in FIG. 2, description therefor will be omitted because those merely show examples.

With the service guide MO tree installed in the terminal, when the service MO of the terminal needs to be changed or updated, the method for changing the MO of the broadcast service guide according to the present invention is applied according to a request of the server or the terminal.

Hereinafter, four exemplary embodiments of the present invention will now be described.

Figure 3:
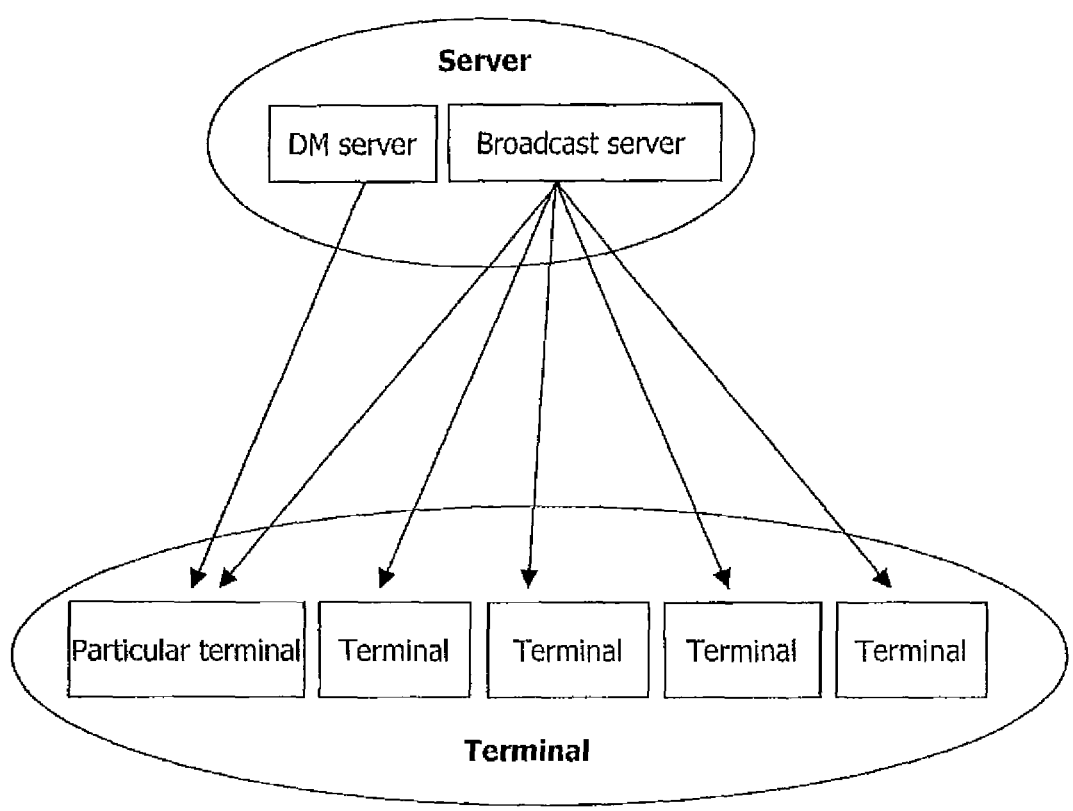
FIG. 3 is a drawing illustrating how a server and a terminal communicate with each other according to an exemplary embodiment of the present invention.

FIG. 3 is a drawing illustrating how a server and a terminal communicate with each other according to an exemplary embodiment of the present invention.

As shown in FIG. 3, the broadcast server and the DM server can be constituted as a single server, and in case of the terminal, there can be a particular terminal which is previously designated and a plurality of non-designated terminals.

Figure 4:
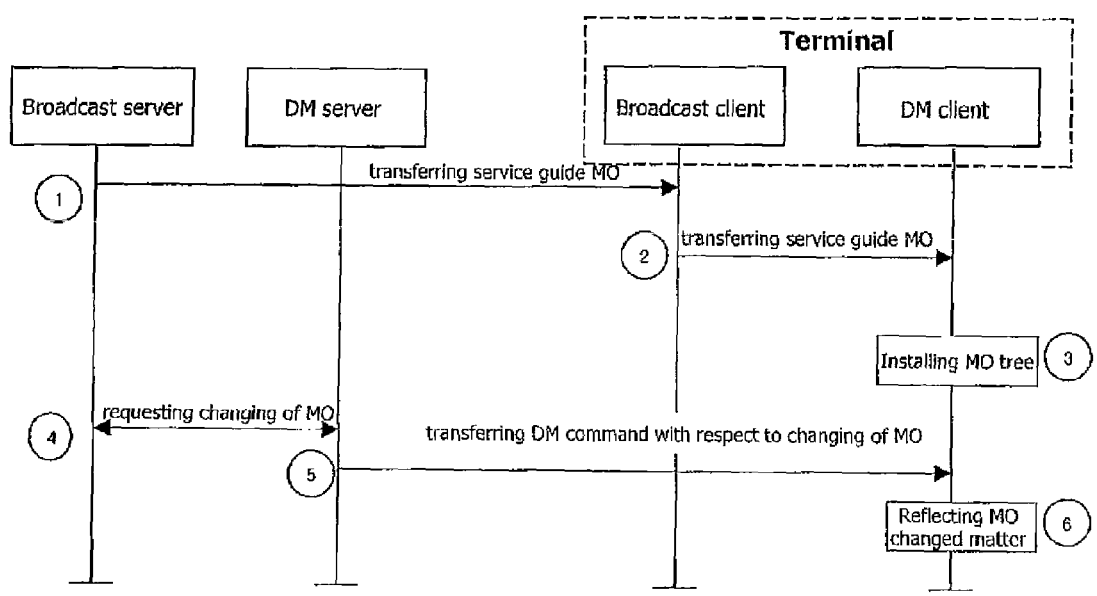
FIG. 4 is a signal flow chart showing a method for changing an MO of a broadcast service guide according to a first exemplary embodiment of the present invention.

FIG. 4 is a signal flow chart showing a method for changing an MO of a broadcast service guide according to a first exemplary embodiment of the present invention.

With reference to FIG. 4, first, the broadcast server transmits a service guide MO obtained by the service guide to the broadcast client.

The broadcast client transmits the received service guide MO to the DM client, and in this case, the MO is provided as a format that can be recognized by the DM client.

The DM client installs the MO tree with the service guide MO. Namely, upon receiving the service guide MO, the DM client searches a parameter of the service guide and maps the corresponding parameter to the DM tree.

In this state, when the terminal has a problem so a response is not clear or when a new parameter needs to be updated, the broadcast server communicates with the DM server in order to check which portion of the service guide MO has been changed or updated, and accordingly shares the changed parameter or updated parameter information with the DM server.

Subsequently, the DM server transfers a DM command with respect to the change in the corresponding MO parameter to the DM client.

In this case, the DM command of the MO change is selected by one of Add, Get or Replace.

Upon receiving the DM command with respect to the changing of the MO from the DM server, the DM client corrects a corresponding parameter value of the DM tree to the changed parameter value.

And then, the DM client maps the changed parameter value of the DM tree to a corresponding portion of the service guide, thus updating the service guide.

Figure 5:
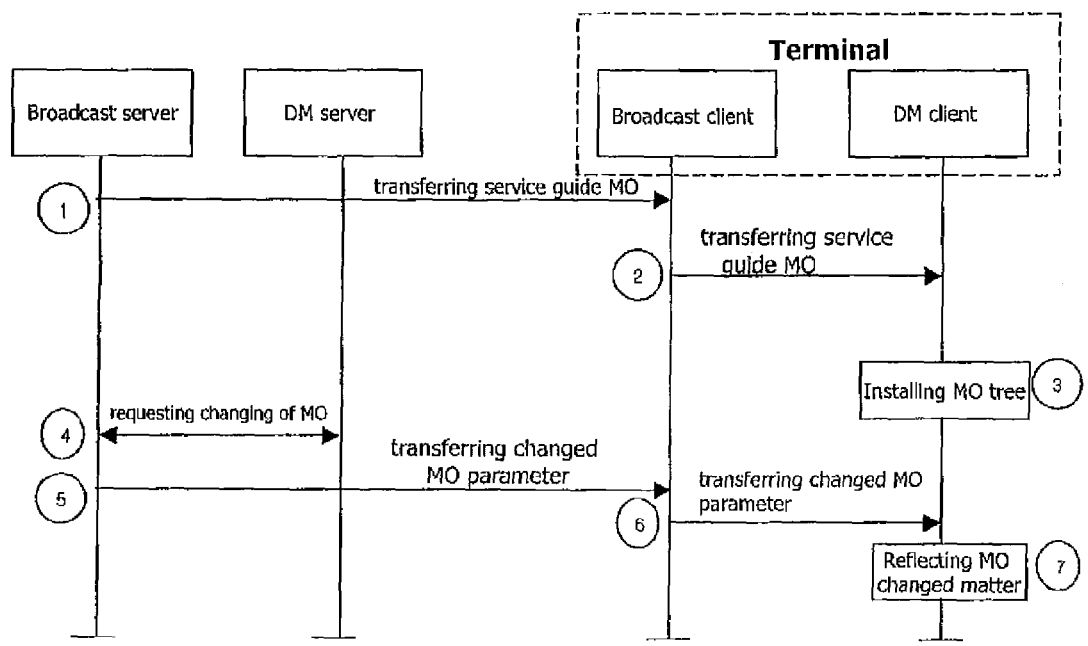
FIG. 5 is a signal flow chart showing a method for changing an MO of a broadcast service guide according to a second exemplary embodiment of the present invention.

FIG. 5 is a signal flow chart showing a method for changing an MO of a broadcast service guide according to a second exemplary embodiment of the present invention.

With reference to FIG. 5, first, the broadcast server transmits a service guide MO to the broadcast client of the terminal, and the broadcast client transmits the service guide MO to the DM client.

The DM client installs a DM tree with the service guide MO. Namely, upon receiving the service guide MO, the DM client searches a parameter of the service guide and maps a corresponding parameter to the DM tree.

In this state, when the terminal has a problem so a response is not clear or when a new parameter needs to be updated, the broadcast server communicates with the DM server in order to check which portion of the service guide MO has been changed or updated, and accordingly shares the changed parameter or updated parameter information with the DM server.

In this case, if the service is to be provided to multiple non-designated terminals, the broadcast server transfers the change-requested MO parameter to broadcast clients of the multiple terminals.

Subsequently, the broadcast client transfers the change-requested MO parameter to the DM client.

In this case, the DM client corrects a corresponding parameter value of the MO tree to the changed new parameter value.

And the DM client maps the changed parameter value of the MO tree to a corresponding portion of the service guide, thereby finally updating the service guide.

Figure 6:
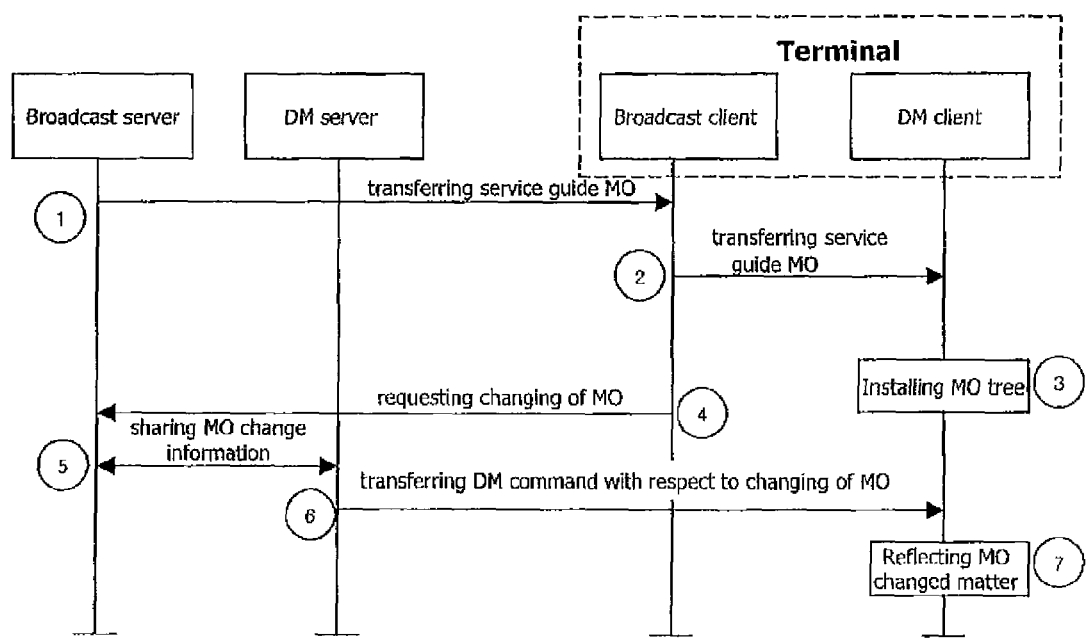
FIG. 6 is a signal flow chart showing a method for changing an MO of a broadcast service guide according to a third exemplary embodiment of the present invention.

FIG. 6 is a signal flow chart showing a method for changing an MO of a broadcast service guide according to a third exemplary embodiment of the present invention.

With reference to FIG. 6, first, the broadcast server transmits a service guide MO to the broadcast client of the terminal.

The broadcast client transmits the received service guide MO to the DM client, and in this case, the MO is provided in a format that can be recognized by the DM client.

The DM client installs a DM tree with the service guide MO. Namely, upon receiving the service guide MO, the DM client searches a parameter of the service guide and maps a corresponding parameter to the DM tree.

In this state, when the terminal has a problem so a response is not clear or when a new parameter needs to be updated, the broadcast client of the terminal directly transfers a change or update request signal to the broadcast server.

Then, the broadcast server communicates with the DM server in order to check which portion of the service guide MO has been changed or updated, and accordingly shares the changed parameter or updated parameter information with the DM server.

Subsequently, the DM server transfers a DM command with respect to the changing of the MO parameter to the DM client.

In this case, the DM command of changing of the MO is selected by one of Add, Get or Replace.

Upon receiving the DM command with respect to changing of the MO from the DM server, the DM client corrects the corresponding parameter value of the MO tree to the changed parameter value.

And then, the DM client maps the changed parameter value of the MO tree to a corresponding portion of the service guide, thereby finally updating the service guide.

Figure 7:
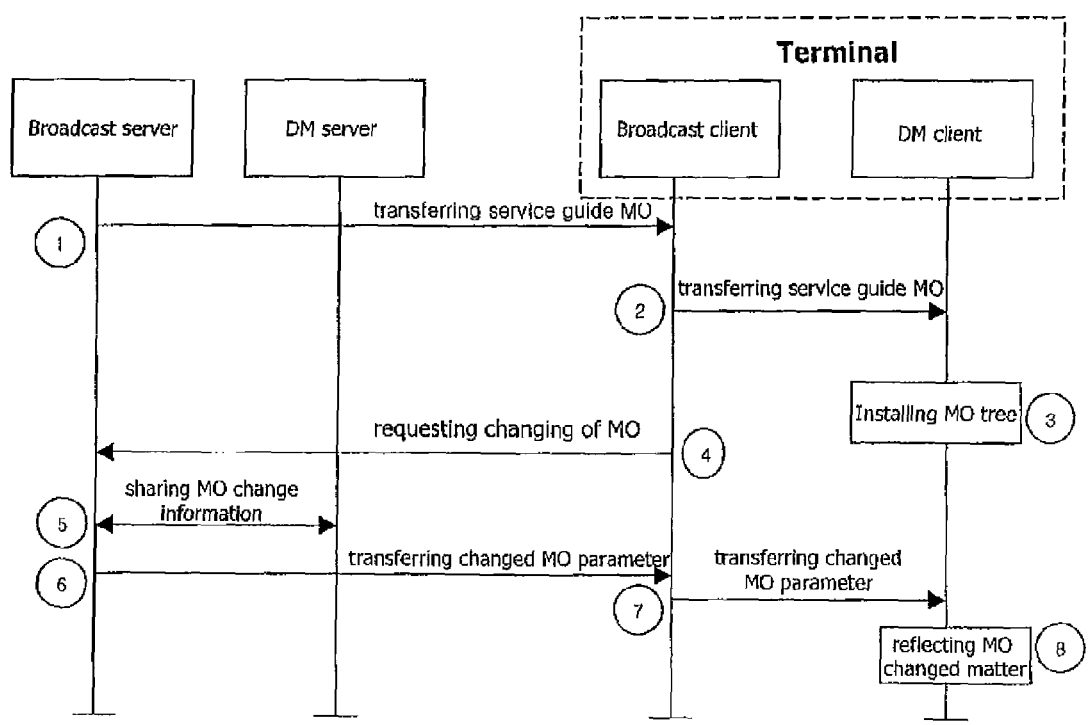
FIG. 7 is a signal flow chart showing a method for changing an MO of a broadcast service guide according to a fourth exemplary embodiment of the present invention.

FIG. 7 is a signal flow chart showing a method for changing an MO of a broadcast service guide according to a fourth exemplary embodiment of the present invention.

With reference to FIG. 7, first, the broadcast server transmits a service guide MO to the broadcast client of the terminal, and the broadcast client transmits the service guide MO to the DM client.

The DM client installs a DM tree with the service guide MO. Namely, upon receiving the service guide MO, the DM client searches a parameter of the service guide and maps a corresponding parameter to the DM tree.

In this state, when the terminal has a problem so a response is not clear or when a new parameter needs to be updated, the broadcast client of the terminal directly transfers a change or update request signal to the broadcast server.

Then, the broadcast server communicates with the DM server in order to check which portion of the service guide MO has been changed or updated, and accordingly shares the changed parameter or updated parameter information with the DM server.

In this case, if the service is to be provided to multiple non-designated terminals, the broadcast server transfers the change-requested MO parameter to broadcast clients of the multiple terminals.

Subsequently, the broadcast client transfers the change-requested MO parameter to the DM client.

In this case, the DM client corrects a corresponding parameter value of the MO tree to the changed new parameter value.

And the DM client maps the changed parameter value of the MO tree to a corresponding portion of the service guide, thereby finally updating the service guide.

It should be understood that the features described herein are related to various types of communication standards, such as OMA, 3GPP, 3GPP2, IEEE and the like.

As so far described, according to the present invention, when the subscriber terminal that receives the broadcast service has a problem or needs to be updated, the problem of the terminal can be remotely, quickly and easily solved by correcting the change-requested parameter of the MO of the service guide of the terminal side according to a request of the server or the terminal.

As the present invention may be embodied in several forms without departing from the essential characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for changing a management object (MO) of a broadcast service guide in a broadcast service by applying a device management (DM) technique based on a two-way communication, the method comprising:

installing, by a terminal, a MO tree of a hierarchy structure using a service guide MO defined by a device management (DM) server upon receiving the service guide MO transmitted by a broadcast server on behalf of the DM server, wherein the service guide MO has been formed as a format of MO for the service guide MO such that the service guide MO is composed of one or more parameters, and includes at least one management object (MO) associated with the broadcast service guide;

directly transferring, by the terminal to the broadcast server, a request to change the service guide MO, wherein the transferred request allows the broadcast server to communicate with the DM server in order to obtain from the DM server information on the one or more parameters to be changed or updated in the service guide MO and transfer the changed or updated one or more parameters to one or more terminals, including the terminal, on behalf of the DM server;

receiving, by the terminal, the changed or updated one or more parameters of the service guide MO transferred from the broadcast server on behalf of the DM server or directly from the DM server in response to the request to change the service guide MO, wherein if the terminal is the only receiver that is intended to receive the changed or updated one or more parameters, the changed or updated one or more parameters are transferred to the terminal in a point-to-point manner by the DM server, and if the terminal is not the only receiver that is intended to receive the changed or updated one or more parameters, the changed or updated one or more parameters are transferred to the terminal in a point-to-multipoint manner by the broadcast server; and updating, by the terminal, a corresponding portion of the service guide MO based on the received change-requested MO parameter using one of the Get, Add and Replace commands.

2. The method of claim 1, wherein the updating further comprises:

transferring, by a broadcast client of the terminal, the changed or updated one or more parameters to a DM client of the terminal; and updating, by the DM client of the terminal, the service guide MO by changing a corresponding parameter value of the installed MO tree to a value of the changed or updated one or more parameters and mapping a value of the changed or updated one or more parameters of the MO tree to a corresponding portion of the service guide MO.

3. The method of claim 1, wherein the installing comprises:

receiving, by a broadcast client of the terminal, the service guide MO from the broadcast server;

transmitting, by the broadcast client of the terminal, the service guide MO to a DM client of the terminal; and installing, by the DM client of the terminal, the MO tree using the service guide MO.

4. A terminal of receiving a broadcast service applying device management (DM) technique based on two-way communication to change a management object (MO) of a broadcast service guide, the terminal comprising:

a processor configured to act as a broadcast client that receives a service guide management object (MO) defined by a device management (DM) server, for which at least one management object has been formed, transmitted by a broadcast server on behalf of the DM server, directly transfers a request to change the service guide MO to the broadcast server, wherein the transferred request allows the broadcast server to communicate with the DM server in order to obtain from the DM server information on the one or more parameters to be changed or updated in the service guide MO and transfer the changed or updated one or more parameters to one or more terminals including the terminal on behalf of the DM server, and receives the changed or updated one or more parameters of the service guide MO transferred from the broadcast server on behalf of the DM server or directly from the DM server in response to the request to change the service guide MO, and a device management (DM) client that installs a management object (MO) tree upon receiving the service guide MO from the broadcast client, and updates at least one parameters of a corresponding MO in the service guide MO based on the changed or updated one or more parameters using one of DM commands including Get, Add and Replace commands which are specified in the service guide MO, wherein if the terminal is the only receiver that is intended to receive the changed or updated one or more parameters, the changed or updated one or more parameters of the service guide MO, in response to the request to change the service guide MO, are received from the broadcast server by the broadcast client, and if the terminal is not the only receiver that is intended to receive the changed or updated one or more parameters, the changed or updated one or more parameters of the service guide MO, in response to the request to change the service guide MO, are received from a device management (DM) server by the DM client.

5. A method for changing a management object (MO) of a broadcast service guide in a point-to-multipoint broadcast service by applying a device management (DM) technique based on a two-way communication, the method comprising:

transferring, by a broadcast server, a service guide MO defined by a device management (DM) server on behalf of the DM server to a terminal in order to be installed in the terminal;

receiving, by the broadcast server, a request to change or update the service guide MO from the terminal;

communicating, by the broadcast server, with the DM server in order to obtain from the DM server information on parameters to be changed or updated in the service guide MO and transfer the changed or updated parameters to one or more terminals, including the terminal, on behalf of the DM server according to the request to change or update the service guide MO; and transferring, by the broadcast server on behalf of the DM server, the changed or updated parameters of the service guide MO to one or more terminals including the terminal if the terminal is not the only receiver that is intended to receive the changed or updated parameters, in order to change or update, by the terminal, a portion of the service guide MO corresponding to the request to change or update the service guide MO using one of DM commands including Get, Add and Replace commands which are specified in the service guide MO.

6. The method of claim 5, wherein the service guide MO has been formed by the broadcast server as a format of MO for the service guide such that the service guide MO is composed of one or more parameters, and includes at least one management object associated with a broadcasting service guide.

7. The method of claim 5, wherein the terminal includes a broadcast client and a device management (DM) client, wherein the broadcast client of the terminal receives the service guide MO from the broadcast server and transfers the received service guide MO to the DM client of the terminal, and the DM client of the terminal installs a MO tree using the service guide MO.

8. The method of claim 7, wherein the service guide MO is provided by the broadcast client of the terminal, in a format that can be recognized by the DM client of the terminal.

9. A method for changing a management object (MO) of a broadcast service guide, in a broadcast service by applying a device management (DM) technique based on a two-way communication, the method comprising:

transferring, by a broadcast server on behalf of a device management (DM) server, a service guide MO defined by the DM server to a broadcast client of a terminal in order to be installed in a DM client of the terminal;

receiving, by the broadcast server, a request to change or update the service guide MO from the broadcast client of the terminal; and communicating, by the broadcast server, with the DM server in order to share information on parameters to be changed or updated in the service guide MO according to the request to change or update the service guide MO, such that the DM server transfers to the DM client of the terminal or each DM client of other terminals, the changed or updated parameters of the service guide MO if the terminal is the only receiver that is intended to receive the changed or updated parameters in order for the DM client of the terminal to change or update a portion of the service guide MO corresponding to the request to change or update the service guide MO using one of DM commands including Get, Add and Replace commands which are specified in the service guide MO.

* * * * *